March 26, 1968  T. A. RUBLE  3,375,075
METHOD AND APPARATUS FOR PRODUCING CARBON BLACK
Filed Nov. 3, 1964
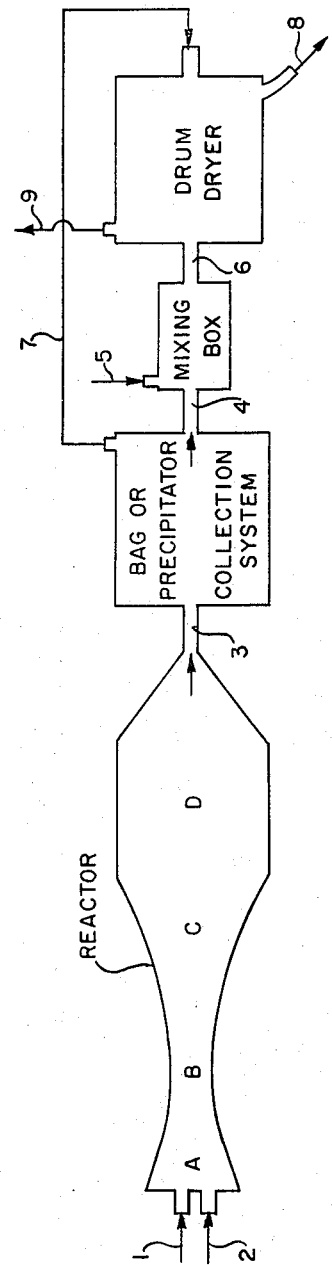
INVENTOR
THEODORE A. RUBLE
BY  L. DAVID TRAPNELL
ATTORNEY

United States Patent Office 3,375,075
Patented Mar. 26, 1968

3,375,075
METHOD AND APPARATUS FOR PRODUCING CARBON BLACK
Theodore A. Ruble, Houston, Tex., assignor to Continental Carbon Company, Houston, Tex., a corporation of Delaware
Filed Nov. 3, 1964, Ser. No. 408,585
6 Claims. (Cl. 23—209.4)

ABSTRACT OF THE DISCLOSURE

Process for making carbon black by introducing feedstock and an oxygen containing gas into a reactor for ignition of the mixture of the feedstock and gas for the formation of gaseous effluent containing carbon black by partial combustion, passing the effluent through a throttled zone of the reactor at a velocity of at least 1,126 feet per second and thereupon into an expansion zone of the reactor for rapid expansion and partial cooling, whereafter the effluent is passed through a further cooling zone to terminate the carbon black forming reaction and then recovering the effluent from the reactor for separation of the carbon black from the effluent. Apparatus for making carbon black comprising a closed elongate reactor, means for introducing feedstock and oxygen containing gas into the reactor, said reactor having reaction, throttled, expansion, and cooling zones together with means for removing the gaseous effluent containing carbon black from the reactor.

---

This invention relates to the manufacture of carbon black, which is used in many commercial activities, such as the manufacture of rubber for various usages, ink pigments, etc.

The most widely practised commercial procedure for manufacturing carbon black involves the utilization of a reactor or furnace wherein the gases and carbon black are at temperatures in the order of 2,500° F. This usually makes it necessary to incorporate a water quench section in which the hot gaseous effluent is contacted with water in order to reduce the temperature thereof to approximately 800° F. prior to passing it into the bags or precipitators of the collection system.

Most frequently the water for the quench system is supplied from a source which is in addition to the other elements of the apparatus.

Another problem resulting from the use of a quench section is that it necessarily increases the volume of gases which must be processed by the collection system.

It is among the objetcs of the present invention to provide a streamlined process and apparatus for the manufacture of carbon which Eliminates the quench section;
Reduces the size of the necessary collection system;
Utilizes the heat value of the hot effluent gases produced by the reactor;
Increases the speed of reaction; and
Provides for the effective regulation of the temperature conditions in the reactor.

The foregoing and other objects will be more fully understood by those skilled in the art as this description proceeds, the said description to be read in conjunction with the annexed drawing wherein the single figure is a schematic representation of an illustrative form of apparatus which may be used to practice the invention.

In the left-hand portion of the schematic view, or flow diagram, of the single figure of drawings, there is shown the reactor wherein the (hydrocarbon oil) feedstock and an oxygen containing gas are rapidly subjected to a combustion reaction.

The reactor, for purposes of disclosure herein, comprises

Reactor section A, wherein the feedstock and the oxygen containing gas are rapidly subjected to the desired combustion reaction;

Throttled section B, wherein the pressure conditions under which the overall reactor are operated are sufficient to attain a velocity of at least Mach 1;

Expansion section C, wherein adiabatic expansion occurs in accordance with the Joule-Thomson effect, causing the rapid expansion and cooling of the gaseous mixture of carbon black and combustion gas; and Cooling section D which is incorporated as a buffer zone to accumulate the cooled gaseous mixture prior to transmitting the same to the collection system.

Briefly stated, the Joule-Thomson effect is based on the finding that a gas drops in temperature when throttled, although this is not universally true. For some gases, notably hydrogen there is an opposite effect at ordinary temperatures and ranges. Whether there is a rise or fall in temperature depends on the particular range of pressure and temperature at which the change occurs. For every gas, there is one temperature at which no temperature change occurs during a Joule-Thomson conversion the same being known as the inversion temperature. Below this temperature a gas cools on throttling; and above this temperature its temperature rises.

The adiabatic effect is based on the principle that if gas, compressed in a vessel, suddenly expands it does so too quickly for heat to get in or out (But energy is used in expanding so the gas cools). An adiabatic heat drop takes place during an adiabatic expansion.

With respect to speed, the mach number (Mach —) is the figure showing the relation between speed of air-flow and the speed of sound. Mach 1 is the speed of sound. The normal velocity of sound in air is 1,126 feet per second.

Hydrocarbon feedstock 1 and oxygen containing gas 2 are injected into the upstream end of the reactor section A of the reactor for conversion of the feedstock to carbon black which is thereafter compressed as a mixture by the pressure conditions in such manner as to attain a velocity of at least Mach 1 through the throttled section B prior to expansion in the expansion section C. After cooling in the cooling section D the carbon black and combustion gas mixture 3 is passed to the bags or precipitators of the collection system. As previously stated, the cooling section D is incorporated as a buffer zone to accumulate the cooled gaseous mixture prior to transmitting it to the collection system.

In the collection system the carbon black and combustion gas mixture 3 is separated into components and the carbon black 4 is passed to the mixing box or wet pelletizer wherein water 5 is added for the pelletizing operation.

Next, the pelletized mixture 6 of carbon black and water is passed to the drum dryer.

Also emanating from the collection system is combustion gas 7 which is passed to the drum dryer and injected therein to for the purpose of providing the heat necessary to remove the water from the wet pelletized mixture 6.

Finished carbon black 8 is produced in the drum dryer and the exhaust gas 9 is discharged to the atmosphere.

The cooling section D of the reactor cools the mixture 3 of carbon black and combustion gas to any desired temperature, preferably in the order of approximately 800° F.

The mixture 3 of carbon black and combustion gas is cooled in the cooling section D of the reactor to any desired temperature, preferably around 800° F. or so, and then passed to the collection system wherein the combustion gas 7 is recovered at a temperature of approximately 400° F. This gas has a high hydrogen and nitrogen content which makes it extremely valauble as the source of heat for the drum dryer.

According to the foregoing construction and arrangement, a quench section between the reactor and the collection system is eliminated, thereby avoiding the addition of water to the mixture 3 which would increase the volume of the gaseous mixture by a factor of at least two due to the vaporization of the water to steam. Since the volume of the gaseous mixture 3 is reduced, the size of the collection system may be proportionately reduced. In the absence of a quench section, the combustion gas 7 passing from the collection system is a dry gas recovered at a temperature of approximately 400° F., or approximately one-half of the temperature at which it enters the collection system; and this gas may be fed directly to the drum dryer without any reduction in its temperature.

The operation of the reactor of the invention under pressures sufficient to achieve the velocity of at least Mach 1 also increases the speed of the formation of carbon black from the feedstock 1 and the oxygen containing gas 2 in the reaction section or zone A, thereby permitting the feed rates and capacity of the unit to be increased accordingly. The control of the velocity of the gaseous mixture 3 through the reactor permits the close control of the temperature in the expansion section C, thereby influencing the type and characteristics of the carbon black being made while providing a means of increased variation in the quality control of the operations of the reactor.

Having thus described the invention, what I claim as new and desire to secure by Letters Patent is:

1. A process for making carbon black comprising:
    (a) introducing a carbon black forming hydrocarbon feedstock and an oxygen-containing gas through a first upstream end of an elongate reactor into a reaction zone;
    (b) igniting a mixture of said feedstock and gas in said reaction zone;
    (c) reacting said feedstock and gas by partial combustion forming a gaseous effluent containing carbon black;
    (d) passing said effluent under pressure through a throttled zone of said reactor having a cross-sectional area substantially less than said reaction zone, said pressure being sufficient to impart a velocity to said effluent of at least 1,126 feet per second through said throttle zone;
    (e) passing said effluent into an expansion zone of said reactor having an expanding cross-sectional area which is substantially greater at the downstream end than any cross-sectional area of said reaction zone, whereby said effluent is subjected to rapid expansion and cooling;
    (f) passing said effluent through a cooling zone of said reactor having about the same cross-sectional area as the downstream end of said expansion zone, whereby said effluent is cooled to a temperature sufficient to terminate the carbon black forming reaction;
    (g) recovering said effluent from said cooling zone; and
    (h) separating the carbon black from said effluent.

2. The process of claim 1 wherein the volume of oxygen-containing gas introduced into said reactor is sufficient for partial combustion of said feedstock.

3. The process of claim 1 wherein said effluent is passed through said throttled zone at conditions of temperature and pressure whereby the throttling effect increases the temperature of said effluent.

4. An apparatus for the making of carbon black comprising:
    (a) a closed elongate reactor having an upstream end and a downstream end;
    (b) a first zone within said reactor adjacent the upstream end thereof forming a reaction zone;
    (c) conduit means extending into said reaction zone adapted to introduce a carbon black forming hydrocarbon feedstock and an oxygen-containing gas into said zone;
    (d) a second zone within said reactor adjacent and on a common axis with said reaction zone having a cross-sectional area substantially less than said reaction zone forming a throttled zone;
    (e) a third zone within said reactor adjacent and on a common axis with said throttled zone, having an expanding cross-sectional area which is substantially greater at the downstream end than any cross-sectional area of said reaction zone forming an expansion zone;
    (f) a fourth zone within said reactor at the downstream end of said reactor adjacent and on a common axis with said expansion zone having a cross-sectional area about the same as the downstream end of said expansion zone forming a cooling zone; and
    (g) conduit means etxending from said cooling zone adapted to remove gaseous effluent containing carbon black from said reactor.

5. The apparatus according to claim 4 wherein said conduit means to introduce said feedstock and gas extend through said upstream end of said reactor parallel to the axis thereof.

6. The apparatus according to claim 4 wherein said cooling zone has a diminishing cross-sectional area to the downstream end of said reactor adapted to communicate with said conduit means, adapted to remove said effluent.

References Cited
UNITED STATES PATENTS

| | | | |
|---|---|---|---|
| 2,967,762 | 1/1961 | Krejci | 23—209.6 |
| 2,973,249 | 2/1961 | Haas | 23—209.6 |
| 3,060,003 | 10/1962 | Williams | 23—209.6 |

FOREIGN PATENTS 3,826,853    12/1963    Japan.

EDWARD J. MEROS, *Primary Examiner.*